United States Patent
Raz et al.

(10) Patent No.: US 8,893,283 B2
(45) Date of Patent: Nov. 18, 2014

(54) PERFORMING AN AUTOMATED COMPLIANCE AUDIT BY VULNERABILITIES

(71) Applicant: Hewlett-Packard Development Company, L.P., Houston, TX (US)

(72) Inventors: Barak Raz, Tel Aviv (IL); Ben Feher, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 109 days.

(21) Appl. No.: 13/755,876

(22) Filed: Jan. 31, 2013

(65) Prior Publication Data

US 2014/0215630 A1   Jul. 31, 2014

(51) Int. Cl.
*G06F 11/00* (2006.01)
*H04L 29/06* (2006.01)

(52) U.S. Cl.
CPC ................................ *H04L 63/1433* (2013.01)
USPC .......................................................... 726/25

(58) Field of Classification Search
USPC ...................................... 726/22, 25; 713/167
See application file for complete search history.

(56) References Cited

U.S. PATENT DOCUMENTS

| | | | |
|---|---|---|---|
| 8,095,984 B2 | 1/2012 | McFarlane et al. | |
| 2002/0147803 A1* | 10/2002 | Dodd et al. | 709/223 |
| 2005/0015622 A1 | 1/2005 | Williams et al. | |
| 2007/0143827 A1 | 6/2007 | Nicodemus et al. | |
| 2009/0024663 A1* | 1/2009 | McGovern | 707/104.1 |
| 2009/0030751 A1 | 1/2009 | Barve et al. | |
| 2011/0277034 A1 | 11/2011 | Hanson | |
| 2011/0307957 A1* | 12/2011 | Barcelo et al. | 726/25 |
| 2012/0102543 A1 | 4/2012 | Kohli et al. | |
| 2012/0232679 A1 | 9/2012 | Abercrombie et al. | |
| 2012/0304300 A1 | 11/2012 | LaBumbard | |
| 2013/0239167 A1* | 9/2013 | Sreenivas et al. | 726/1 |
| 2013/0253978 A1* | 9/2013 | Adachi et al. | 705/7.28 |

OTHER PUBLICATIONS

"McAfee Vulnerability Manager"; < http://www.mcafee.com/in/products/vulnerability-manager.aspx >, Retrieved Jan. 8, 2013.
"RandomStorm announces new vulnerability management platform", < http://www.randomstorm.com/news-randomstorm-new-scanning.php >, Oct. 16, 2012.
"Started Trial of Automated Collection of Vulnerability Countermeasure Information Released by Product Developers", > http://www.ipa.go.jp/security/english/vuln/JVNiPedia2009q1_en.html >, May, 2009.
Neuhaus et al.; "Security Trend Analysis with CVE Topic Models", < http://dspace.ucalgary.ca/bitstream/1880/48066/1/2010-970-19.pdf>, Nov. 1-4, 2010.
Seville, "Common Vulnerability Scoring System (CVSS-SIG)", > http://www.first.org/cvs: >, Jun. 20, 2007.

* cited by examiner

*Primary Examiner* — Beemnet Dada

(57) ABSTRACT

An automated enterprise compliance auditing by vulnerabilities system including an enterprise asset database, a compliance regulation including compliance controls, a known asset vulnerabilities database including details of publicly known asset vulnerabilities, compliance control associating functionality to associate each of a set of audited assets with at least a subset of compliance controls of the compliance regulation, the audited assets being a subset of the enterprise assets, vulnerability mapping functionality to map each compliance control to a subset of the known asset vulnerabilities which may impact compliance of at least one of the audited assets therewith, asset scanning functionality to scan each audited asset to ascertain to which publicly known asset vulnerabilities the audited asset is vulnerable to, and numeric compliance score calculating functionality to, responsive to the associating, mapping and scanning, calculate for each audited asset, a numeric compliance score for each compliance control associated therewith.

15 Claims, 3 Drawing Sheets

PERFORMING AN AUTOMATED COMPLIANCE AUDIT BY VULNERABILITIES

BACKGROUND OF THE INVENTION

The process of implementing a compliance regulation in an enterprise typically includes defining a collection of enterprise assets that need to comply with the regulation and associating a regulation, or a subset thereof, with each of the collection of assets.

Then, a manual audit of the assets is done to verify compliance with the regulation.

BRIEF DESCRIPTION OF THE DRAWINGS

The present disclosure will be understood and appreciated more fully from the following detailed description, taken in conjunction with the drawings in which.

DETAILED DESCRIPTION OF EMBODIMENTS

The process of implementing a compliance regulation in an enterprise typically includes:

defining a collection of enterprise assets which need to comply with the regulation;

associating a regulation, or a subset thereof, with each of the collection of assets; and auditing the assets to verify compliance with the regulation.

Typically, auditing the regulation in the enterprise is performed manually, and is therefore time consuming and error-prone. The present disclosure seeks to provide automated enterprise compliance auditing capabilities.

Figure 1:
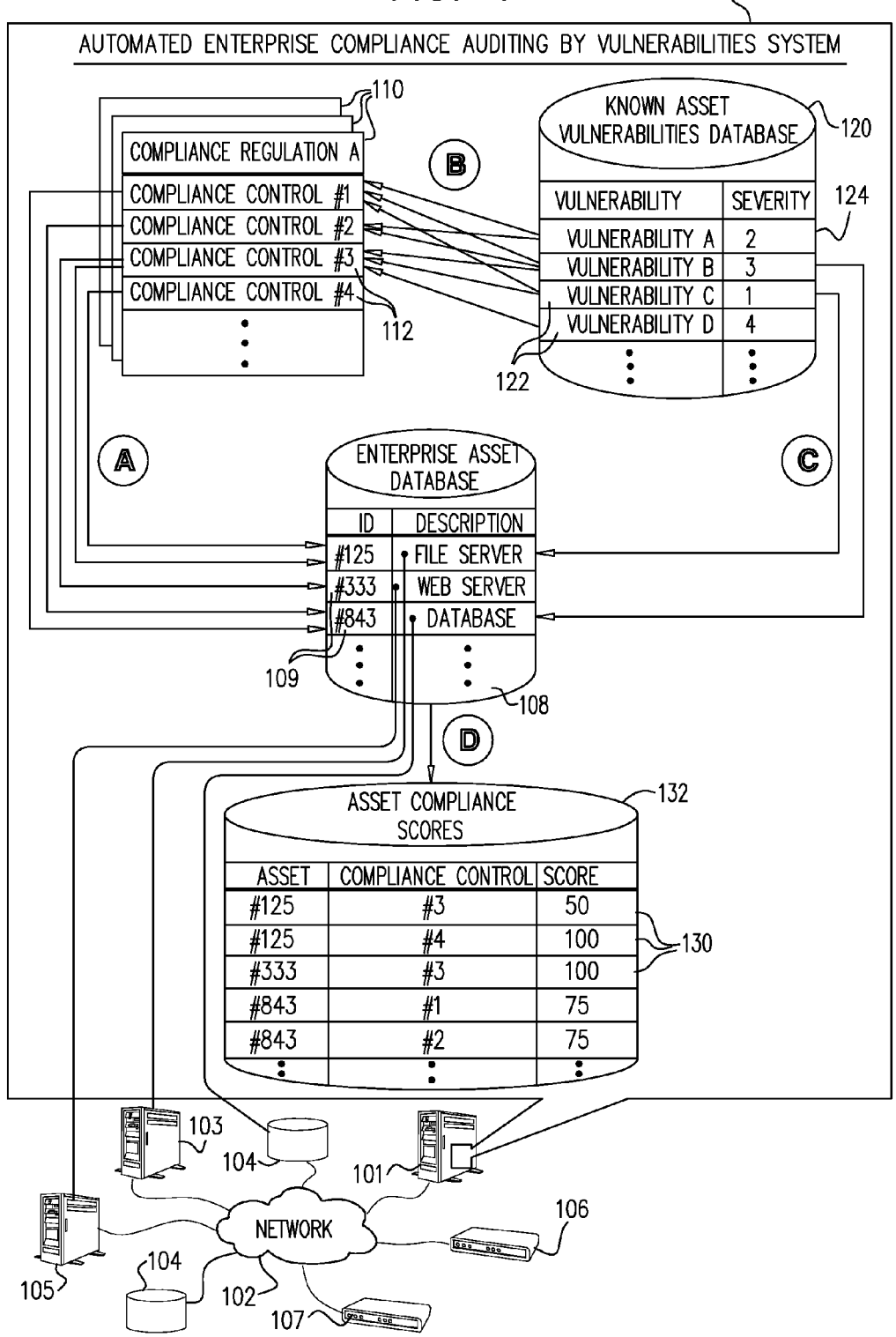
FIG. 1 is a simplified symbolic functional block diagram illustration of an automated enterprise compliance auditing by vulnerabilities system and its functionality in accordance with an example.

Reference is now made to FIG. 1, which is a simplified symbolic functional block diagram illustration of an automated enterprise compliance auditing by vulnerabilities system and its functionality in accordance with an example. The automated enterprise compliance auditing by vulnerabilities system 100 of FIG. 1 is embodied in a computer product including anon-transitory, tangible computer-readable medium, such as a computer hard disk, in which computer program instructions are stored, and which resides on a computer server 101 connected to an enterprise-wide computer network 102. System 100 is suitable for auditing a plurality of enterprise computer assets connected to network 102, such as, for example, computer servers 103, databases 104, web servers 105 and internet sites hosted thereupon, network routers 106 and firewalls 107.

Automated enterprise compliance auditing by vulnerabilities system 100 includes an enterprise asset database 108 which includes details of assets 109 of the enterprise, such as computer servers 103, databases 104, web servers 105, network routers 106 and firewalls 107. Database 108 also stores a hierarchical structure of assets 109.

System 100 is operable to audit at least a subset of assets 109 of asset database 108 by ascertaining compliance of each of the subset of assets 109 with at least one compliance regulation 110, which at least one compliance regulation 110 or each including a multiplicity of compliance controls 112. Compliance controls 112 typically include a collection of rules, which when complied with by enterprise assets 109, ensures that enterprise assets 109 and services hosted thereupon are configured, managed, monitored and utilized securely.

System 100 also includes a known asset vulnerabilities database 120, which includes details of publicly known asset vulnerabilities 122. Each of publicly known asset vulnerabilities 122 can have a severity value 124 associated therewith. It is appreciated that known asset vulnerabilities database 120 may be imported from a source external to system 100. Alternatively, known asset vulnerabilities database 120 may reside on a source external to system 100.

As shown in step A of FIG. 1, each asset 109 which is to be audited is associated with a subset of compliance controls 112, which compliance controls 112 are relevant to the auditing of asset 109. It is appreciated that this association of compliance controls 112 to assets 109 may be performed manually or automatically by system 100.

As further shown in step B of FIG. 1, each of compliance controls 112 can be mapped to a subset of publicly known asset vulnerabilities 122 which may potentially impact compliance of at least one asset 109 associated therewith. It is appreciated that the mapping of compliance controls 112 to publicly known asset vulnerabilities 122 may be performed manually or automatically by system 100.

As yet further shown in step C of FIG. 1, each asset 109 which is to be audited is scanned and associated with publicly known asset vulnerabilities 122 to which asset 109 is vulnerable to.

As yet further shown in step D of FIG. 1, for each audited asset 109, a numeric compliance score 130 is calculated for each compliance control 112 associated therewith, numeric compliance scores 130 being stored in an asset compliance score database 132.

It is a particular feature of the present example that each of numeric compliance scores 130 is a numeric value which may extend over a range of possible numeric values. Typically, lower compliance score values represent relatively poor compliance of an asset with compliance controls associated therewith, and higher compliance score values represent relatively satisfactory compliance of an asset with compliance controls associated therewith. In the example of FIG. 1, the range of compliance scores 130 is between 0 and 100.

The following factors may impact the calculation of numeric compliance scores 130 for each audited asset 109:

a preexisting compliance score for asset 109;

the number of vulnerabilities 122 to which asset 109 is vulnerable to, regardless of their severity 130; and the severity 124 of each of vulnerabilities 122 to which asset 109 is vulnerable to whereby a vulnerability having higher severity 124 can have a higher impact on numeric compliance score 130 of asset 109 than a vulnerability having a lower severity 124, and whereby the vulnerability having the highest severity 124 has the highest impact on numeric compliance score 130 of asset 109. It is appreciated that in the example of FIG. 1, a higher severity of a vulnerability is denoted by a lower number. For example, severity of 1 is considered to be higher than a severity of 4.

It is a particular feature of the present example that the numeric compliance score calculation is operative to transform vulnerability of an asset 109 to multiple vulnerabilities 122 into one unified numeric score 130.

In the example of FIG. 1, asset #843, corresponding to database 104 is vulnerable to publicly known asset vulnerability B, which vulnerability B is potentially vulnerable to compliance controls #1, #2 & #3. Compliance controls #1 & #2 are in turn relevant to the auditing of asset #843. Therefore the vulnerability of asset #843 to publicly known asset vulnerability B, which has a severity of 3, is a factor in reducing the compliance score of asset #843 for each of compliance controls #1 & #2 to 75.

Similarly, asset #125, corresponding to computer server 103, is vulnerable to publicly known asset vulnerability C, which vulnerability C is potentially vulnerable to compliance controls #1 & #3. Compliance control #3 is in turn relevant to the auditing of asset #125. Therefore the vulnerability of asset #125 to publicly known asset vulnerability C, which has a severity of 1, is a factor in reducing the compliance score of asset #125 for compliance control #3 to 50. Asset #125 was not found to he vulnerable to any of publicly known asset vulnerabilities 122 which are potentially vulnerable to compliance control #4, therefore the compliance score of asset #125 for compliance control #4 is 100.

It is appreciated that vulnerability C, having a severity of 1, has a higher impact on lowering the compliance score of asset #125 for compliance control #3 than the impact of vulnerability B, having a severity of 3, has on lowering the compliance score of asset #843 for compliance controls #1 & #2.

As further shown in FIG. 1, asset #333, corresponding to web server 105, was not found to be vulnerable to any of vulnerabilities 122, and therefore has a compliance score of 100.

Figure 2:
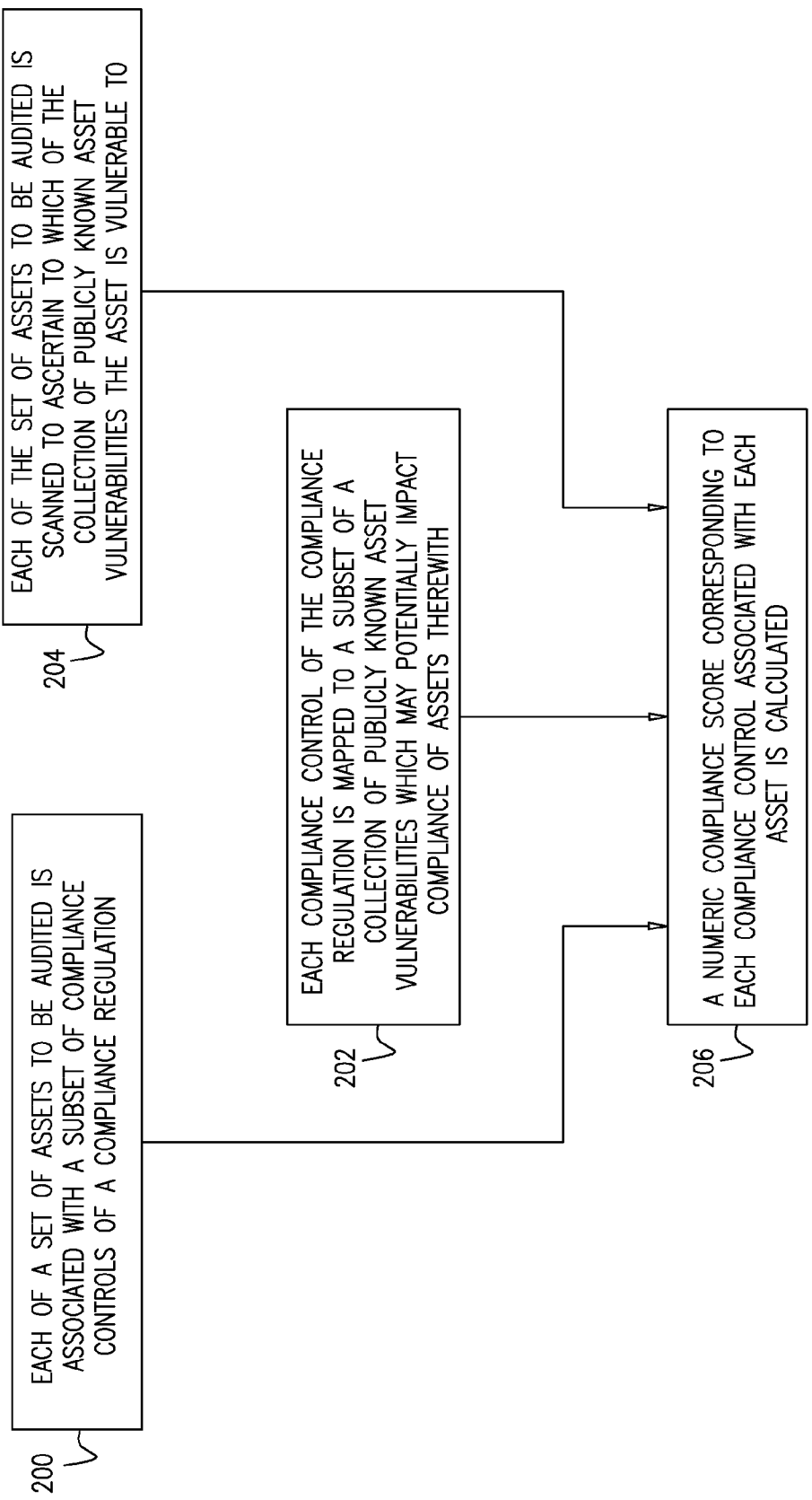
FIG. 2 is a simplified block diagram illustration indicating steps in the operation of the automated enterprise compliance auditing by vulnerabilities system of FIG. 1, according to one example.

Reference is now made to FIG. 2, which is a simplified block diagram illustration indicating steps in the operation of the automated enterprise compliance auditing by vulnerabilities system of FIG. 1, according to one example.

As shown in FIG. 2, each of a set of assets to be audited is initially associated with at least a subset of compliance controls of at least one compliance regulation (200). Additionally, each compliance control of the compliance regulation is mapped to a subset of a collection of publicly known asset vulnerabilities which may potentially impact compliance of at least one asset therewith (202). Additionally, each of the set of assets to be audited is scanned to ascertain to which of the collection of publicly known asset vulnerabilities the asset is vulnerable to (204).

Responsive to the associating (200), the mapping (202) and the scanning (204), a numeric compliance score corresponding to each compliance control associated with each asset is calculated (206). As described hereinabove with reference to FIG. 1, it is a particular feature of the present example that each of the numeric compliance scores has a numeric value which may extend over a range of possible numeric values. Typically, lower compliance score values represent relatively poor compliance of an asset with compliance controls associated therewith, and higher compliance score values represent relatively satisfactory compliance of an asset with compliance controls associated therewith.

Figure 3:
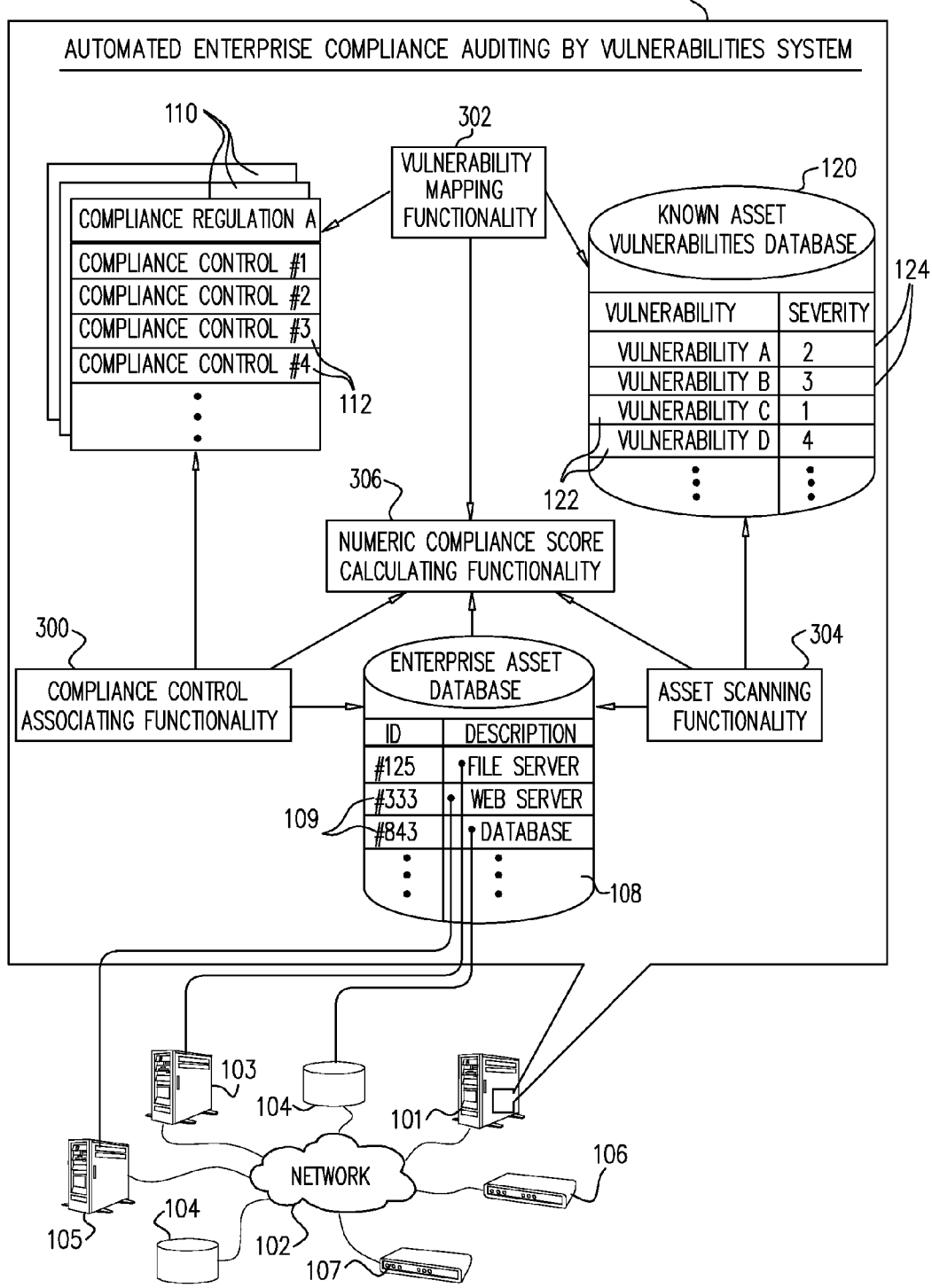
FIG. 3 is a simplified functional block diagram illustration of the system of FIG. 1, according to one example.

Reference is now made to FIG. 3, which is a simplified functional block diagram illustration of the system of FIG. 1, according to one example.

As shown in FIG. 3 and as described hereinabove with reference to FIG. 1, there is provided an automated enterprise compliance auditing by vulnerabilities system 100 which is embodied in a computer product including a non-transitory, tangible computer-readable medium, such as a computer hard disk, in which computer program instructions are stored, and which can reside on a computer server 101 connected to an enterprise-wide computer network 102. System 100 is suitable for auditing a plurality of enterprise computer assets connected to network 102, such as, for example, computer servers 103, databases 104, web servers 105 and internet sites hosted thereupon, network routers 106 and firewalls 107.

Automated enterprise compliance auditing by vulnerabilities system 100 can include an enterprise asset database 108 which includes details of assets 109 of the enterprise, such as computer servers 103, databases 104, web servers 105, network routers 106 and firewalls 107. Database 108 also stores a hierarchical structure of assets 109.

System 100 is operable to audit at least a subset of assets 109 of asset database 108 by ascertaining compliance of each of the subset of assets 109 with at least one compliance regulation 110, which at least one compliance regulation 110 or each including a multiplicity of compliance controls 112. Compliance controls 112 typically include a collection of rules, which when complied with by enterprise assets 109, ensures that enterprise assets 109 and services hosted thereupon are configured, managed, monitored and utilized securely.

System 100 also can include known asset vulnerabilities database 120 which includes details of publicly known asset vulnerabilities 122. Each of publicly known asset vulnerabilities 122 has a severity value 124 associated therewith. It is appreciated that known asset vulnerabilities database 120 may be imported from a source external to system 100. Alternatively, known asset vulnerabilities database 120 may reside on a source external to system 100.

Compliance control associating functionality 300 is provided for associating each asset 109 which is to be audited with at least a subset of compliance controls 112, whereby each of the subset of compliance controls 112 is relevant to the auditing of asset 109.

Vulnerability mapping functionality 302 is provided for mapping each of compliance controls 112 to at least a subset of publicly known asset vulnerabilities 122 which may potentially impact compliance of at least on asset 109 therewith.

Asset scanning functionality 304 is provided, for scanning each of assets 109 in asset database 108 which are to be audited to ascertain to which of publicly known asset vulnerabilities 122 audited asset 109 is vulnerable to.

Numeric compliance score calculating functionality 306 is provided to utilize information from compliance control associating functionality 300, vulnerability mapping functionality 302 and asset scanning functionality 304 to calculate, for each audited asset 109, a numeric compliance score 130 for each compliance control 112 associated therewith.

Each of the functionality may include, for example, hardware devices including electronic circuitry for implementing the functionality described herein. In addition or as an alternative, each of the functionality may be implemented as a series of instructions encoded on a machine-readable storage medium of a computing device and executable by a processor. It should be noted that, in some embodiments, some of the functionality are implemented as hardware devices, while other functionality are implemented as executable instructions.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. An automated enterprise compliance auditing by vulnerabilities system comprising:
   an enterprise asset database comprising details of assets of said enterprise;
   at least one compliance regulation, each of said at least one compliance regulation comprising at least one compliance control;
   a known asset vulnerabilities database comprising details of publicly known asset vulnerabilities;
   compliance control associating functionality to associate each of a set of audited assets with at least a subset of compliance controls of said at least one compliance regulation, said set of audited assets being at least a subset of said assets of said enterprise;
   vulnerability mapping functionality to map each compliance control of said at least one compliance regulation to a subset of said publicly known asset vulnerabilities which may potentially impact compliance of at least one of said audited assets therewith;
   asset scanning functionality to scan each audited asset of said set of audited assets to ascertain to which of said publicly known asset vulnerabilities said audited asset is vulnerable to; and
   numeric compliance score calculating functionality to, responsive to said associating, said mapping and said scanning, calculate for each of said set of audited assets, a numeric compliance score for each compliance control associated therewith, said numeric compliance score being within a range of possible numeric compliance scores.

2. An automated enterprise compliance auditing by vulnerabilities system according to claim 1 and wherein said database also comprises a hierarchical structure of said assets.

3. An automated enterprise compliance auditing by vulnerabilities system according to claim 1 and wherein each of said publicly known asset vulnerabilities has a severity value associated therewith.

4. An automated enterprise compliance auditing by vulnerabilities system according to claim 1 and wherein when calculating said numeric compliance score for each of said set of audited assets, said numeric compliance score calculating functionality is operative to consider at least one of:
   a preexisting compliance score for said audited asset;
   a number of said publicly known asset vulnerabilities to which said audited asset is vulnerable to; and
   a severity of each of said publicly known asset vulnerabilities to which said audited asset is vulnerable to.

5. An automated enterprise compliance auditing by vulnerabilities system according to claim 4 and wherein when calculating said numeric compliance score for each of said set of audited assets, a high severity publicly known asset vulnerability has a higher impact on said numeric compliance score of an audited asset vulnerable thereto than a low severity publicly known asset vulnerability.

6. An automated enterprise compliance auditing by vulnerabilities system according to claim 4 and wherein when calculating said numeric compliance score for each of said set of audited assets, a publicly known asset vulnerability having a highest severity among said publicly known asset vulnerabilities to which said audited asset is vulnerable to, has a highest impact on said numeric compliance score of an audited asset.

7. A computer product for automatic asset compliance auditing in an enterprise, including a non-transitory, tangible computer-readable medium in which computer program instructions are stored, which instructions, when read by a computer, cause the computer to associate each of a set of audited assets with at least a subset of compliance controls of at least one compliance regulation, said set of audited assets being at least a subset of said assets of said enterprise, to map each compliance control of said at least one compliance regulation to a subset of a collection of publicly known asset vulnerabilities which may potentially impact compliance of at least one of said audited assets therewith, to scan each audited asset of said set of audited assets to ascertain to which of said collection of publicly known asset vulnerabilities said audited asset is vulnerable to, and responsive to said associating, said mapping and said scanning, to calculate, for each of said set of audited assets, a numeric compliance score for each compliance control associated therewith, said numeric compliance score being within a range of possible numeric compliance scores.

8. A computer product for automatic asset compliance auditing in an enterprise according to claim 7 and wherein each of said publicly known asset vulnerabilities has a severity value associated therewith.

9. A computer product for automatic asset compliance auditing in an enterprise according to claim 7 and wherein said numeric compliance score is calculated for each of said set of audited assets by considering at least one of:
   a preexisting compliance score for said audited asset;
   a number of said publicly known asset vulnerabilities to which said audited asset is vulnerable to; and
   a severity of each of said publicly known asset vulnerabilities to which said audited asset is vulnerable to.

10. A computer product for automatic asset compliance auditing in an enterprise according to claim 9 and wherein when calculating said numeric compliance score for each of said set of audited assets, a high severity publicly known asset vulnerability has a higher impact on said numeric compliance score of an audited asset vulnerable thereto than a low severity publicly known asset vulnerability.

11. A computer product for automatic asset compliance auditing in an enterprise according to claim 9 and wherein when calculating said numeric compliance score for each of said set of audited assets, a publicly known asset vulnerability having a highest severity among said publicly known asset vulnerabilities to which said audited asset is vulnerable to, has a highest impact on said numeric compliance score of an audited asset.

12. A method for asset compliance auditing in an enterprise, said method comprising:
   associating each of a set of audited assets with at least a subset of compliance controls of at least one compliance regulation, said set of audited assets being at least a subset of said assets of said enterprise;
   mapping each compliance control of said at least one compliance regulation to a subset of a collection of publicly known asset vulnerabilities which may potentially impact compliance of at least one of said assets therewith;
   scanning each audited asset of said set of audited assets to ascertain to which of said collection of publicly known asset vulnerabilities said audited asset is vulnerable to; and
   responsive to said associating, said mapping and said scanning, calculating via at least one processor, for each of said set of audited assets, a numeric compliance score corresponding to each compliance control associated therewith, a numeric compliance score for each compliance control associated therewith, said numeric compliance score being within a range of possible numeric compliance scores.

13. A method for asset compliance auditing in an enterprise according to claim 12 and wherein each of said publicly known asset vulnerabilities has a severity value associated therewith.

14. A method for asset compliance auditing in an enterprise according to claim 12 and wherein said numeric compliance score is calculated for each of said set of audited assets by considering at least one of:
   a preexisting compliance score for said audited asset;
   a number of said publicly known asset vulnerabilities to which said audited asset is vulnerable to; and
   a severity of each of said publicly known asset vulnerabilities to which said audited asset is vulnerable to.

15. A method for asset compliance auditing in an enterprise according to claim 12 and wherein:
   when calculating said numeric compliance score for each of said set of audited assets, a high severity publicly known asset vulnerability has a higher impact on said numeric compliance score of an audited asset vulnerable thereto than a low severity publicly known asset vulnerability; and
   when calculating said numeric compliance score for each of said set of audited assets, a publicly known asset vulnerability having a highest severity among said publicly known asset vulnerabilities to which said audited asset is vulnerable to, has a highest impact on said numeric compliance score of an audited asset.

\* \* \* \* \*